United States Patent
Roev et al.

(10) Patent No.: US 9,966,644 B2
(45) Date of Patent: May 8, 2018

(54) CATHODE, LITHIUM AIR BATTERY INCLUDING THE SAME, AND METHOD OF PREPARING THE CATHODE

(71) Applicant: Samsung Electronics Co., Ltd., Suwon-si, Gyeonggi-do (KR)

(72) Inventors: Victor Roev, Suwon-si (KR); Hyunjin Kim, Suwon-si (KR); Taeyoung Kim, Seoul (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 121 days.

(21) Appl. No.: 14/740,665

(22) Filed: Jun. 16, 2015

(65) Prior Publication Data

US 2016/0079590 A1 Mar. 17, 2016

(30) Foreign Application Priority Data

Sep. 15, 2014 (KR) .................. 10-2014-0122035

(51) Int. Cl.
*H01M 12/08* (2006.01)
*H01M 4/587* (2010.01)
(Continued)

(52) U.S. Cl.
CPC .......... *H01M 12/08* (2013.01); *H01M 4/587* (2013.01); *H01M 4/8657* (2013.01); *H01M 4/88* (2013.01); *H01M 4/9008* (2013.01); *H01M 4/9016* (2013.01); *H01M 4/96* (2013.01); *H01M 2300/0085* (2013.01); *Y02E 60/128* (2013.01)

(58) Field of Classification Search
CPC .... H01M 12/08; H01M 4/587; H01M 4/8657; H01M 4/88; H01M 4/9008; H01M 4/9016; H01M 4/96; H01M 2300/0085; Y02E 60/128
See application file for complete search history.

(56) References Cited

U.S. PATENT DOCUMENTS 5,571,638 A 11/1996 Satoh et al.
7,976,983 B2 * 7/2011 Nakura ................. H01M 4/131
252/182.1

(Continued)

FOREIGN PATENT DOCUMENTS

JP 07-220733 A 8/1995
JP 2001006683 A * 1/2001
(Continued)

OTHER PUBLICATIONS

Andrei et al., "Some Possible Approaches for Improving the Energy Density of Li-Air Batteries", Journal of The Electrochemical Society, vol. 157, No. 12, 2010, pp. A1287-A1295.
(Continued)

*Primary Examiner* — Gregg Cantelmo
(74) *Attorney, Agent, or Firm* — Cantor Colburn LLP

(57) ABSTRACT

A cathode for a lithium air battery, the cathode including: an organic-inorganic composite material including a coating layer on at least one portion of a surface thereof, wherein the coating layer includes a positively charged silane compound and an ionic bond forming anion. Also a lithium air battery including the same, and a method of manufacturing the cathode.

20 Claims, 9 Drawing Sheets

(51) Int. Cl.
*H01M 4/86* (2006.01)
*H01M 4/88* (2006.01)
*H01M 4/90* (2006.01)
*H01M 4/96* (2006.01)

(56) References Cited

U.S. PATENT DOCUMENTS

| | | |
|---|---|---|
| 2007/0154766 A1 | 7/2007 | Baik et al. |
| 2012/0115049 A1 | 5/2012 | Rinzler et al. |
| 2013/0130131 A1* | 5/2013 | Johnson ............ H01M 12/08 429/403 |
| 2014/0234733 A1* | 8/2014 | Roev ............... H01M 4/8657 429/405 |
| 2014/0315086 A1* | 10/2014 | Put ................. H01M 4/0416 429/220 |
| 2015/0155549 A1* | 6/2015 | Moganty ............ H01M 4/583 429/213 |
| 2016/0079641 A1 | 3/2016 | Kim et al. |

FOREIGN PATENT DOCUMENTS

| | | | |
|---|---|---|---|
| JP | 2008-066202 | A | 3/2006 |
| JP | 2008293678 | A * | 12/2008 |
| JP | 2012-502427 | A | 1/2012 |
| KR | 10-0765966 | B1 | 10/2007 |
| KR | 10-0312680 | B1 | 11/2011 |
| KR | 1020120023715 | A | 3/2012 |
| WO | 2005078852 | A1 | 8/2005 |
| WO | 2010027337 | A1 | 3/2010 |
| WO | 2010126767 | A2 | 4/2010 |

OTHER PUBLICATIONS

Ding et al., "Smart multifunctional fluids for lithium ion batteries: Enhanced rate performance and intrinsic mechaical protection", University of Wollongong Research Online, 2013, p. 1-14.

Xia et al, "Silica Nanoparticles as Structural Promoters for Oxygen Cathodes of Lithium-Oxygen Batteries", The Journal of Physical Chemistry, 117, 2013, 19897-19904.

* cited by examiner

CATHODE, LITHIUM AIR BATTERY INCLUDING THE SAME, AND METHOD OF PREPARING THE CATHODE

CROSS REFERENCE TO RELATED APPLICATION

This application claims priority to and the benefit of Korean Patent Application No. 10-2014-0122035, filed on Sep. 15, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode, a lithium air battery including the same, and methods of preparing the cathode.

2. Description of the Related Art

Since a lithium air battery uses a lithium metal as an anode and does not have to store air to provide oxygen, the cathode active material, within the battery, the lithium air battery may have high capacity. A lithium air battery has a high theoretical energy density per unit weight of 3,500 Wh/kg or greater, which is about ten times greater than that of a lithium ion battery.

The lithium air battery may use an organic electrolyte or an aqueous electrolyte as a lithium ion conducting medium. However, these electrolytes may deteriorate safety and stability of the lithium air battery since battery resistance may increase due to volatilization of the electrolyte from a cathode during long term operation of the battery. Also, an anode may be corroded or hydrogen gas may be generated due to oxygen and moisture infiltrated into the battery.

In order to improve safety and stability, the lithium air battery may use a gel electrolyte or a solid electrolyte. However, use of the gel electrolyte or a solid electrolyte may reduce discharge capacity of the lithium air battery since ion conductivity may decrease and interface resistance may increase due to poor contact to a cathode by the gel electrolyte or the solid electrolyte. Thus, there remains a need for an improved cathode.

SUMMARY

Provided is a cathode including an organic-inorganic composite material.

Provided is a lithium air battery including the cathode.

Provided is a method of manufacturing the cathode.

Additional aspects will be set forth in part in the description which follows and, in part, will be apparent from the description.

According to an aspect of an embodiment, a cathode for a lithium air battery includes: an organic-inorganic composite material including a coating layer on at least one portion of a surface of the organic-inorganic composite material, wherein the coating layer includes a positively charged silane compound and an anion capable of forming an ionic bond.

According to an aspect of another embodiment, a lithium air battery includes: an anode capable of intercalating and deintercalating lithium ions; the cathode; and an electrolyte interposed between the anode and the cathode.

According to an aspect of another embodiment, a method of manufacturing a cathode includes: adding a reactive compound to a porous carbonaceous material to bond a reactive functional group to a surface of the porous carbonaceous material to provide a functionalized porous carbonaceous material; adding a positively charged silane compound to the functionalized porous carbonaceous material to form a mixture; heat-treating the mixture to prepare an organic-inorganic composite material including a coating layer including a silane compound chemically bonded to the reactive functional group; washing the organic-inorganic composite material including the coating layer with a salt; and drying the washed organic-inorganic composite material to prepare an organic-inorganic composite material including a coating layer including an anion capable of forming an ionic bond.

BRIEF DESCRIPTION OF THE DRAWINGS //

The patent or application file contains at least one drawing executed in color. Copies of this patent or patent application publication with color drawing(s) will be //provided by the Office upon request and payment of the necessary fee.

These and/or other aspects will become apparent and more readily appreciated from the following description of the exemplary embodiments, taken in conjunction with the accompanying drawings in which.

DETAILED DESCRIPTION

Figure 1:
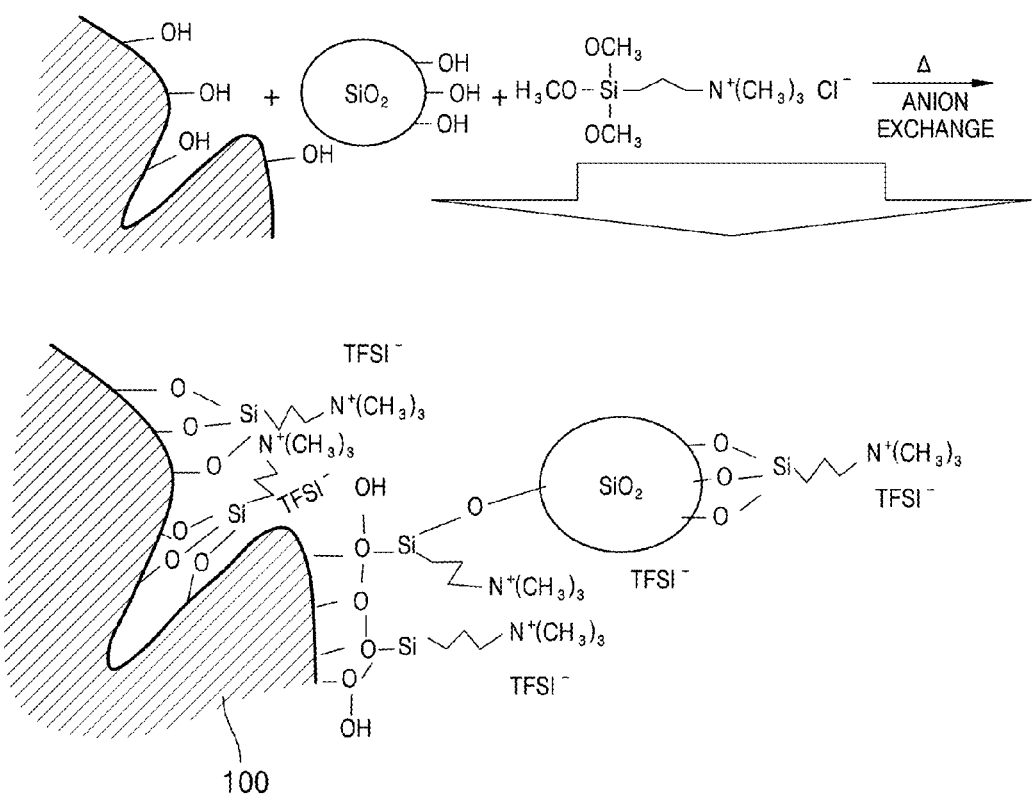
FIG. 1 is a schematic diagram of an embodiment of a reaction for forming a chemical bond between a positively charged silane-based compound, $SiO_2$, and a surface of an organic-inorganic composite material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects of the invention. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

Hereinafter, a cathode, a lithium air battery including the same, and a method of manufacturing the cathode, according to an embodiment, will be described in further detail.

The cathode is a cathode for a lithium air battery, and according to an embodiment includes an organic-inorganic composite material having a coating layer on at least one portion thereof, wherein the coating layer includes a positively charged silane-based compound and an anion capable of forming an ionic bond.

The lithium air battery may use an aqueous electrolyte or an organic electrolyte as an electrolyte. When the organic electrolyte is used, the lithium air battery may have a reaction mechanism represented by Reaction Scheme 1 below.

Reaction Scheme 1

$$4Li + O_2 \leftrightarrow 2Li_2O \quad E° = 2.91V$$

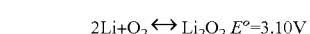

$$2Li + O_2 \leftrightarrow Li_2O_2 \quad E° = 3.10V$$

During discharge, a lithium ion originated from an anode reacts with oxygen introduced from the cathode to form a lithium oxide, and as a result, the oxygen is reduced in an oxygen reduction reaction (ORR). On charge, the lithium oxide is reduced, and oxygen is generated as a result of oxidizing the oxygen in an oxygen evolution reaction (OER). During discharge, $Li_2O_2$ is deposited in pores of the cathode, and a capacity of the lithium air battery increases as a concentration of oxygen diffused into the cathode increases.

However, since an amount of $Li_2O_2$ generated during discharge is generally greater than an amount of $Li_2O_2$ decomposed during charge, $Li_2O_2$ accumulates on the surface, e.g., on an outer surface or in the pores of the cathode, and gradually blocks a passage for oxygen, eventually preventing charge and discharge.

While not wanting to be bound by theory, it is believed that because the cathode according to an embodiment has the coating layer including the positively charged silane-based compound and the anion capable of forming an ionic bond on the surface of the organic-inorganic composite material, e.g., in the pores of the organic-inorganic composite material, the electrolyte is blocked from contacting the cathode by the positively charged silane-based compound, thereby reducing an amount of electrolytic solution impregnated into the cathode. Accordingly, interface resistance between an electrolyte and the surface of the cathode may be reduced and a passage for oxygen transfer may be obtained, and as a result the discharge capacity of a lithium air battery including the cathode is increased.

The organic-inorganic composite material may include a porous carbonaceous material. The porous carbonaceous material may be used as a core of the organic-inorganic composite material. For example, the porous carbonaceous material may have a specific surface area of 300 square meters per gram ($m^2/g$) or greater, e.g., 300 $m^2/g$ to 2000 $m^2/g$, 500 $m^2/g$ to 1500 $m^2/g$, or 700 $m^2/g$ to 1300 $m^2/g$, and may have nanometer-sized pores, micrometer-sized pores, or macrometer-sized pores, e.g., pores having an average or diameter as determined by nitrogen absorption of 10 nm to 100 μm, for example 20 nm to 1 μm, or 10 nm to 500 nm, or 0.5 μm to 10 μm, or 1 μm to 100 μm. Examples of the porous carbonaceous material include at least one selected from carbon black, graphite, graphene, activated carbon, carbon fiber, and carbon nanotube. The carbon nanotube may include at least one selected from a single-walled carbon nanotube (SWCNT), a multi-walled carbon nanotube (MWCNT), or a three-dimensional (3D) carbon nanotube network. A combination comprising at least one of the foregoing carbonaceous materials may be used.

The coating layer may include the positively charged silane-based compound and the anion capable of forming an ionic bond, wherein the silane-based compound may be chemically bonded to the surface of the organic-inorganic composite material 100, as shown schematically in FIG. 1. The coating layer may be chemically bonded to a reactive functional group present on the surface of the organic-inorganic composite material. Since the positively charged silane-based compound forms a chemical bond, e.g., a covalent bond, to the surface of the organic-inorganic composite material, e.g., to a surface of a nano-sized pore or micrometer-sized pore of the organic-inorganic composite material, an amount of the electrolytic solution impregnated into the porous carbonaceous material may be reduced. While not wanting to be bound by theory, it is understood that only macrometer-sized pores are impregnated with the electrolytic solution to generate $Li_2O_2$ during discharge. Thus if the pores smaller than macrometer-size are blocked by the coating layer, the electrolytic solution does not enter the smaller pores, thus preventing occlusion of smaller pores by the $Li_2O_2$.

The reactive functional group may be a lyophilic functional group including at least one functional group selected from a hydroxyl group (—OH), a carboxyl group (—COOH), and an aldehyde group (—CHO). For example, the reactive functional group may be a hydroxyl group (—OH). The reactive functional group may be present on the surface of the core of the porous carbonaceous material and improve wettability and accessibility of the electrolyte.

The positively charged silane-based compound may include at least one positively charged organofunctional group selected from a quaternary ammonium group, an imidazolium group, a pyridinium group, a pyrrolidinium group, a piperidinium group, and a morpholinium group. For example, the positively charged silane-based compound may be a positively charged organofunctional group of a quaternary ammonium group. The positively charged organofunctional group reacts with the reactive functional group existing on the surface of the core of the porous carbonaceous material to form a chemical bond, thereby improving stability. Thus, a lithium air battery having improved stability may be provided.

The silane-based compound may be a positively charged silane coupling agent. For example, the silane-based compound may include at least one selected from N-trimethoxysilylpropyl-N,N,N-trimethyl ammonium chloride, N-triethoxysilylpropyl-N,N,N-trimethyl ammonium chloride, and 1-methyl-3-(3-trimethoxysilylpropyl) imidazolium chloride. For example, the silane-based compound may be N-trimethoxysilylpropyl-N,N,N-trimethyl ammonium chloride or N-triethoxysilylpropyl-N,N,N-trimethyl ammonium chloride.

The anion capable of forming an ionic bond may include at least one selected from $PF_6^-$, $BF_4^-$, $SbF_6^-$, $AsF_6^-$, $(SO_2C_2F_5)_2N^-$, $(CF_3SO_2)_2N^-$, $C_4F_9SO_3^-$, $ClO_4^-$, $AlO_2^-$, $AlCl_4^-$, $(C_xF_{2x+1}SO_2)(C_yF_{2y+1}SO_2)N^-$ wherein x and y are natural numbers, $F^-$, $Br^-$, $Cl^-$, $I^-$, and $(C_2O_4)_2B^-$. The anion capable of forming an ionic bond may be an anion of a molten salt. The anion capable of forming an ionic bond may be anion-exchanged with an anion of the silane-based compound, thereby further improving stability of the surface of the organic-inorganic composite material in contact with the electrolyte.

The organic-inorganic composite material may be in the form of a particle. That is, the organic-inorganic composite material may be in the form of a particle or powder. Thus, the organic-inorganic composite material may be molded into various forms and used for a variety of conditions.

An amount of the coating layer may be in a range of about 0.1% by weight to about 20% by weight, based on a total weight of the organic-inorganic composite material. For example, the amount of the coating layer may be in a range of about 0.1% by weight to about 15% by weight, based on the total weight of the organic-inorganic composite material. For example, the amount of the coating layer may be in a range of about 0.1% by weight to about 10% by weight, based on the total weight of the organic-inorganic composite material. When the coating layer has the amount within these ranges, ion conductivity may be improved and interface resistance of the lithium air battery may be reduced, thereby improving discharge capacity.

The coating layer may further include metal oxide particles. The metal oxide particles may include oxide particles of at least one element selected from magnesium (Mg), aluminum (Al), silicon (Si), phosphorus (P), calcium (Ca), titanium (Ti), vanadium (V), gallium (Ga), germanium (Ge), strontium (Sr), zirconium (Zr), niobium (Nb), molybdenum (Mo), indium (In), tin (Sn), hafnium (Hf), thallium (Ta), and tungsten (W). For example, the metal oxide particles may include oxide particles of at least one element selected from magnesium (Mg), aluminum (Al), silicon (Si), phosphorus (P), calcium (Ca), and titanium (Ti).

The metal oxide particles may have an average particle diameter of about 1 nanometer (nm) to about 100 nm. For example, the metal oxide particles may have an average particle diameter of about 2 nm to about 80 nm. For example, the metal oxide particles may have an average particle diameter of about 3 nm to about 50 nm.

A reactive functional group may be disposed on the surface of the metal oxide particles. The reactive functional group of the surface of the metal oxide particles may be chemically bonded to the positively charged silane-based compound and the anion capable of forming an ionic bond, and thus the coating layer may be connected to the surface of the porous carbonaceous material in a grafted form. The metal oxide connected in a grafted form from the surface of the porous carbonaceous material may form a covalent bond with the porous carbonaceous material to support the structure of the pores of the porous carbonaceous material. Accordingly, the metal oxide may facilitate oxygen transfer into the cathode, thereby increasing capacity of a lithium air battery including the cathode.

The reactive functional group may include at least one lyophilic functional group selected from a hydroxyl group (—OH), a carboxyl group (—COOH), and an aldehyde group (—CHO). For example, the reactive functional group may be a hydroxyl group (—OH). Since the reactive functional group is present on the surface of the metal oxide, wettability and accessibility of the electrolyte may be improved.

An amount of the metal oxide particles may be in a range of about 0.1% by weight to about 30% by weight, based on a total weight of the cathode. For example, the amount of the metal oxide particles may be in a range of about 0.1% by weight to about 25% by weight, based on the total weight of the cathode. For example, the amount of the metal oxide particles may be in a range of about 0.1% by weight to about 20% by weight, based on the total weight of the cathode. When the amount of the metal oxide particles is within the foregoing ranges, oxygen transfer effect may be further improved since a passage for oxygen transfer is more easily obtained.

The cathode may further include an oxygen oxidation/reduction catalyst. For example, the catalyst may include at least one selected from a metal particle, a metal oxide particle, and an organometallic compound.

The metal particle of the oxygen oxidation/reduction catalyst may include at least one selected from Co, Ni, Fe, Au, Ag, Pt, Ru, Rh, Os, Ir, Pd, and an alloy thereof. The metal oxide particle of the oxygen oxidation/reduction catalyst may include at least one selected from manganese oxide, cobalt oxide, iron oxide, zinc oxide, nickel oxide, strontium oxide, lanthanum oxide, barium oxide, lithium oxide, titanium oxide, potassium oxide, magnesium oxide, calcium oxide, yttrium oxide, niobium oxide, zirconium oxide, copper oxide, chromium oxide, molybdenum oxide, a metal oxide having perovskite crystal structure having a composition of a formula of $AMO_3$ such as $(Sm_xSr_{1-x})CoO_3$, $(La_xSr_{1-x})MnO_3$, $(La_xSr_{1-x})CoO_3$, $(La_xSr_{1-x})(Fe_yCo_{1-y})O_3$, $(La_xSr_{1-x})(Fe_aCo_bNi_c)O_3$, $La_{0.8}Sr_{0.2}MnO_3$ (LSM), and $La_{0.6}Sr_{0.4}Co_{0.8}Fe_{0.2}O_3$ (LSCF), and a composite oxide thereof, wherein $0 \leq x \leq 1$, $0 \leq y \leq 1$, $0 \leq a \leq 1$, $0 \leq b \leq 1$, $0 \leq c \leq 1$, and $a+b+c=1$. The organometallic compound may include an aromatic heterocyclic compound that is coordinated to a transition metal, but is not limited thereto. Any suitable material available as an oxygen oxidation/reduction catalyst in the art may also be used.

For example, the oxygen oxidation/reduction catalyst may include at least one selected from tungsten carbide (WC), WC fused cobalt, $CoWO_4$, $FeWO_4$, NiS, $WS_2$, $La_2O$, $Ag_2O$, and cobalt phthalocyanine, or the like.

In addition, the oxygen oxidation/reduction catalyst may be disposed on a support. The support may be the above-described porous carbonaceous composite material, carbon, or the like. Examples of the carbon include carbon black, such as Ketjen black, acetylene black, channel black, and lamp black; graphite such as natural graphite, artificial graphite, and expanded graphite; activated carbon; and carbon fibers, without being limited thereto. Any suitable material available as a support in the art may be used.

A lithium air battery according to another embodiment includes an anode capable of intercalating and deintercalating lithium ions; the cathode, and an electrolyte disposed between the anode and the cathode.

Examples of the anode capable of intercalating and deintercalating lithium ions include at least one selected from Li metal, an alloy of Li metal, and a material capable of intercalating lithium ions, without being limited thereto. Any suitable material available as an anode capable of intercalating and deintercalating lithium ions in the art may be used. Lithium metal is specifically mentioned. The alloy of the Li metal may be an alloy of lithium and another metal, such as at least one selected from aluminum, tin, magnesium, indium, calcium, titanium, and vanadium.

The cathode is as described above.

The cathode may be prepared by mixing an organic-inorganic composite material, a solvent, and a binder, if desired, to prepare a cathode slurry, and coating and drying the cathode slurry on a surface of a current collector or optionally applying the cathode slurry to the current collector by compression-molding to provide a cathode having improved electrode density.

The binder may include a thermoplastic resin or a thermosetting resin. Examples of the binder are polyethylene, polypropylene, polytetrafluorethylene (PTFE), polyvinylidene difluoride (PVdF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in combination, without being limited thereto. Any suitable material available as a binder in the art may also be used.

A porous body having a network structure or mesh structure may be used as the current collector to facilitate diffusion of oxygen. A porous metal plate comprising at least one selected from stainless steel, nickel, and aluminum may be used, without being limited thereto. Any suitable material available as a current collector in the art may be used. The current collector may be coated with an oxidation resistant metal or an alloy coating film to prevent oxidation.

The cathode slurry may further include an oxygen oxidation/reduction catalyst and a conductive material. Also, the cathode slurry may further include a lithium oxide.

Any suitable porous and conductive material may be used as the conductive material of the cathode slurry, and for example, a porous carbonaceous material may be used. Examples of the porous carbonaceous material are carbon black, graphite, graphene, activated carbon, and carbon fiber. Also, a metallic conductive material, which can be in the form of metal fibers or a metal mesh, may be used. Moreover, a metal powder comprising at least one selected from copper, silver, nickel, and aluminum, and the like may be used. An organic conductive material, such as a polyphenylene derivative, may be used. The conductive material may be used alone or in combination.

The electrolyte may be at least one selected from a liquid electrolyte, a gel electrolyte, and a solid electrolyte. The liquid electrolyte may be an organic electrolyte or an aqueous electrolyte.

The organic electrolyte may include an aprotic solvent. Examples of the aprotic solvent are a carbonate-based, ester-based, ether-based, ketone-based, and alcohol-based solvent. Examples of the carbonate-based solvents include dimethyl carbonate (DMC), diethyl carbonate (DEC), ethyl methyl carbonate (EMC), dipropyl carbonate (DPC), methyl propyl carbonate (MPC), ethyl propyl carbonate (EPC), methylethyl carbonate (MEC), ethylene carbonate (EC), propylene carbonate (PC), butylene carbonate (BC), and tetraethylene glycol dimethyl ether (TEGDME). Examples of the ester-based solvents include methyl acetate, ethyl acetate, n-propyl acetate, dimethyl acetate, methyl propionate, ethyl propionate, γ-butyrrolactone, decanolide, valerolactone, mevalonolactone, and caprolactone. Examples of the ether-based solvents include dibutyl ether, tetraglyme, diglyme, dimethoxyethane, 2-methyltetrahydrofuran, and tetrahydrofuran. An example of the ketone-based solvent is cyclohexanone. Also, examples of the alcohol-based solvent include ethyl alcohol and isopropyl alcohol. Examples of the aprotic solvent are not limited thereto, and any suitable aprotic solvent may be used. The combination comprising at least one of the foregoing solvents may be used.

In addition, examples of the aprotic solvent include nitriles such as nitriles of the formula R—CN wherein R is a $C_2$-$C_{20}$ linear, branched, or cyclic hydrocarbon-based moiety that may include a double-bonded aromatic ring or an ether bond, an amide such as dimethylformamide, a dioxolane such as 1,3-dioxolane, and a sulfolane.

The aprotic solvent may be used alone or in a combination thereof. In a combination, a mixing ratio of at least two aprotic solvents may be selected depending on performance of the battery. Determination of a suitable mixing ratio may be determined by one of skill in the art without undue experimentation and thus will not be further elaborated on herein.

The organic electrolyte may include a salt of an alkali metal and/or an alkaline earth metal. The salt of the alkali metal and/or alkaline earth metal, dissolved in an organic solvent, may be used as a source of alkali metal ions and/or alkaline earth metal ions in the battery. For example, the salt may facilitate migration of the alkali metal ions and/or alkaline earth metal ions between the cathode and the anode.

For example, cations of the alkali metal salt and/or alkaline earth metal salt may include at least one selected from lithium ions, sodium ions, magnesium ions, potassium ions, calcium ions, rubidium ions, strontium ions, cesium ions, and barium ions, and the like.

Anions of the alkali metal salt and/or alkaline earth metal salt contained in the organic electrolyte may include at least one ion selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ wherein x is a natural number, $(C_xF_{2x+1}SO_2)(C_yF_{2y+1}SO_2)N$ wherein x and y are natural numbers, and a halide.

For example, the salt of the alkali metal and/or alkaline earth metal may include at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiF, LiBr, LiCl, LiI, and $LiB(C_2O_4)_2$ (lithium bis(oxalato)borate (LiBOB)), without being limited thereto. Any suitable material available as a salt of an alkali metal and/or alkaline earth metal in the art may be used.

In the organic electrolyte, an amount of the salt of the alkali metal and/or alkaline earth metal may be in a range from about 100 millimolar (mM) to about 10 M, for example, from about 500 mM to about 2 M. However, the amount of the salt of the alkali metal and/or alkaline earth metal is not particularly limited thereto, as long as the organic electrolyte may effectively transfer lithium ions and/or electrons during charge and discharge.

The gel electrolyte may include the organic electrolyte or the salt of an alkali metal and/or an alkaline earth metal as described above. Alternatively, the gel electrolyte may include a polymer electrolyte or the salt of an alkali metal and/or alkaline earth metal as described above. The polymer electrolyte may include an ion conductive polymer and/or a block copolymer.

The ion conductive polymer may include at least one selected from polyethylene oxide (PEO), polysiloxane, polypropylene oxide (PPO), polyethylene oxide-grafted polymethylmethacrylate (PEO-grafted PMMA), and polysiloxane-grafted PMMA block, without being limited thereto, and any other suitable ion conductive polymer used in the art may also be used.

The block copolymer may include a diblock copolymer or a triblock copolymer. Examples of the block copolymer may include at least one selected from a PEO-polystyrene (PS) copolymer, a PEO-PMMA copolymer, a PS-polysiloxane copolymer, a polysiloxane-PMMA copolymer, a PS-PEO-PS copolymer, and a PEO-PPO-PEO copolymer, without being limited thereto, and any other suitable block copolymers used in the art may also be used.

The gel electrolyte may further include a metal oxide. The metal oxide may be an oxide of at least one element selected from magnesium (Mg), aluminum (Al), silicon (Si), phosphorus (P), calcium (Ca), titanium (Ti), vanadium (V), gallium (Ga), germanium (Ge), strontium (Sr), zirconium (Zr), niobium (Nb), molybdenum (Mo), indium (In), tin (Sn), hafnium (Hf), thallium (Ta), and tungsten (W). For example, the metal oxide may be an oxide of at least one element selected from magnesium (Mg), aluminum (Al), silicon (Si), phosphorus (P), calcium (Ca), and titanium (Ti).

An amount of the metal oxide may be in a range of about 1% by weight to about 20% by weight, based on the total weight of the cathode. For example, the amount of the metal oxide may be in a range of about 3% by weight to about 20% by weight, based on the total weight of the cathode. For example, the amount of the metal oxide may be in a range of about 5% by weight to about 20% by weight, based on the total weight of the cathode. When the amount of the metal oxide is within these ranges, the gel electrolyte may have excellent stability.

The electrolyte may further include at least one of an ionic liquid and an oligomer. The ionic liquid may include a compound comprising cations of a linear or a branched substituted ammonium, imidazolium, pyrrolidinium, or piperidinium compound and anions of $PF_6^-$, $BF_4^-$, $CF_3SO_3^-$, $(CF_3SO_2)_2N^-$, or $(CN)_2N^-$. The oligomer may include an ethylene oxide repeating unit and may have a number average molecular weight (Mn) of about 200 Daltons (Da) to about 2000 Da. Examples of the oligomer may include at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), poly(diethylene glycol) dimethyl ether (DEGDME), and poly(ethylene glycol) diacrylate (PEGDA).

The lithium air battery may further include a separator interposed between the anode and the cathode. The separator is not limited so long as a composition thereof is durable in an operating environment of the lithium air battery, and examples of the separator are at least one selected from a non-woven polymer such as a non-woven fabric of a polypropylene material or a non-woven fabric of a polyphenylene sulfide material, a porous film of an olefin-based resin such as polyethylene, and polypropylene.

Also, a solid electrolyte membrane may be additionally disposed between the anode and the organic electrolyte. The solid electrolyte membrane may be a lithium ion conductive solid electrolyte membrane. The lithium ion conductive solid electrolyte membrane may serve as a protective layer that protects lithium contained in the anode from directly reacting with the impurities, such as water, oxygen and the like, included in the liquid electrolyte. Examples of the lithium ion conductive solid electrolyte membrane are lithium ion conductive glass, lithium ion conductive crystalline (ceramic or glass-ceramic), and an inorganic material containing a mixture thereof, without being limited thereto, and any suitable material available as a lithium ion conductive solid electrolyte membrane in the art may also be used. Also, if improved chemical stability of the solid electrolyte membrane is desired, a lithium ion conductive solid electrolyte membrane comprising an oxide may be used.

An example of the lithium ion conductive crystalline oxide may be $Li_{1+x+y}(Al_zGa_{1-z})_x(Ti_zGe_{1-z})_{2-x}Si_yP_{3-y}O_{12}$ wherein $0 \le x \le 1$, $0 \le y \le 1$, and $0 \le z \le 1$, and for example, $0 \le x \le 0.4$, $0 < y \le 0.6$, or $0.1 \le x \le 0.3$, $0.1 < y \le 0.4$). Examples of the lithium ion conductive glass-ceramic are lithium-aluminum-germanium-phosphate (LAGP), lithium-aluminum-titanium-phosphate (LATP), and lithium-aluminum-titanium-silicon-phosphate (LATSP).

The lithium ion conductive solid electrolyte membrane may further include a polymer solid electrolyte component, in addition to a glass-ceramic component. The polymer solid electrolyte component may be a polyethylene oxide doped with a lithium salt, and examples of the lithium salt are $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, and $LiC_4F_9SO_3$, $LiAlCl_4$.

The lithium ion conductive solid electrolyte membrane may further include an inorganic solid electrolyte component, in addition to the glass-ceramic component. Examples of the inorganic solid electrolyte component are $Cu_3N$, $Li_3N$, LiPON, and the like.

The lithium air battery may be manufactured as follows.

First, the cathode described above; an anode capable of incorporating and deincorporating, e.g., intercalating and deintercalating, lithium ions, and a separator are prepared.

Next, the anode is mounted in one side of a case, and the cathode provided with the separator is mounted in the other side opposite to the anode within the case. Then, an electrolyte is disposed, e.g., injected, between the cathode and the anode, a porous current collector is disposed on the cathode, and a pressing member that allows air to flow to the cathode is pressed to fix a cell, thereby completing the manufacture of the lithium air battery. A lithium ion conductive solid electrolyte membrane may further be disposed on a surface of the anode.

The case may be divided into upper and lower parts, which contact the anode and cathode, respectively. An insulating resin may be interposed between the upper and lower parts to electrically insulate the cathode and the anode from each other.

The lithium air battery may be a lithium primary battery or a lithium secondary battery. The lithium air battery may have any of various forms, and for example, may be in the form of a coin, a button, a sheet, a stack, a cylinder, a plane, or a horn. Also, the lithium air battery may be provided as a large battery for electric vehicles.

Figure 2:
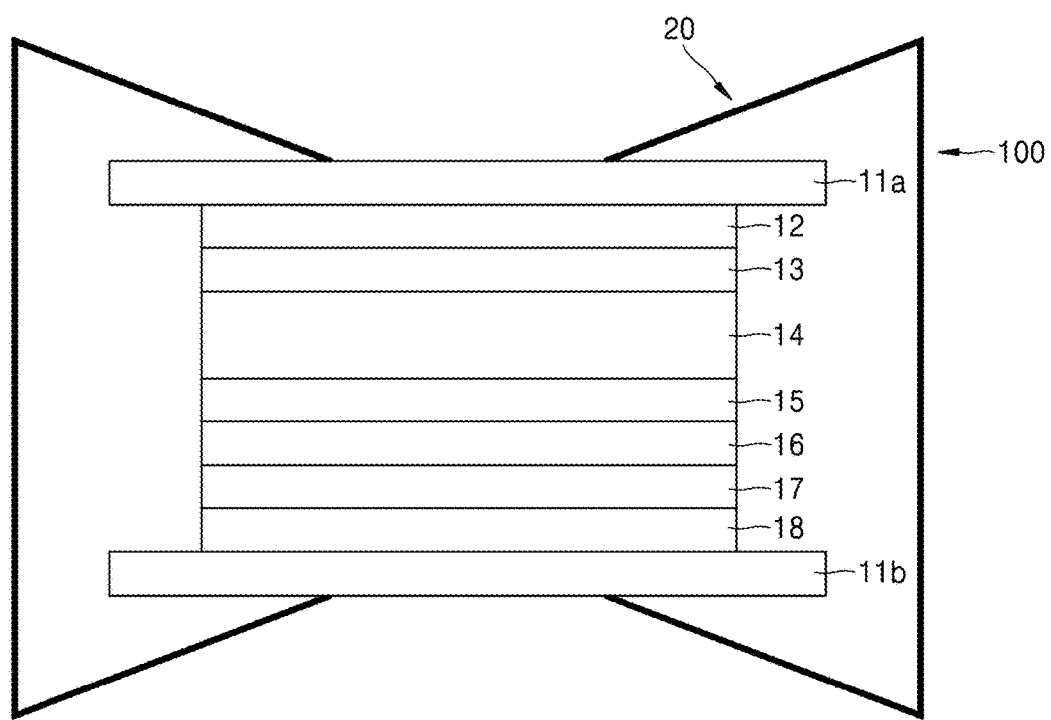
FIG. 2 is a schematic diagram of a structure of an embodiment of a lithium air battery.

FIG. 2 is a schematic diagram of a structure of a lithium air battery according to an embodiment.

Referring to FIG. 2, in a cathode 14, the organic or inorganic electrolyte and a gel electrolyte, as further described above, are complexed with each other, and the cathode 14 is disposed on a solid electrolyte membrane 15. A gas diffusion layer 13, a first current collector 12, and a support 11a, e.g., Teflon, are sequentially disposed on the cathode 14. In addition, a lithium metal thin film anode 17 and a polymer electrolyte membrane 16 are sequentially disposed between the solid electrolyte membrane 15 and a second current collector (e.g., copper foil) 18. The polymer electrolyte membrane 16 may comprise a lithium ion conductive polymer electrolyte membrane. The polymer electrolyte membrane 16 may have the same components as the polymer solid electrolyte. The second current collector 18 may be any suitable conductive current collector having conductivity, without limitation. For example, the current collector may comprise at least one selected from stainless steel, nickel (Ni), copper (Cu), aluminum (Al), iron (Fe), titanium (Ti), and carbon (C), or the like. Also, the second current collector 18 may a suitable form, and may have a thin film shape, a plate shape, a mesh shape, and a grid shape. For example, the second current collector 18 may be copper foil. The second current collector 18 may be fixed on a Teflon base 11b.

The term "air" used herein is not limited to atmospheric air, and may refer to a combination of gases including oxygen or pure oxygen gas. This broad definition of "air" may also be applied to other terms, such as an air battery and an air cathode.

A method of manufacturing a cathode according to another embodiment includes: adding a reactive compound to a porous carbonaceous material to bond a reactive functional group to a surface of the porous carbonaceous material to provide a functionalized porous carbonaceous material having a reactive functional group on a surface thereof; adding a positively charged silane-based compound to the functionalized porous carbonaceous material to form a mixture; heat-treating the mixture to prepare an organic-inorganic composite material comprising a coating layer including a silane-based compound chemically bonded to the reactive functional group; washing the organic-inorganic composite material comprising the coating layer with a salt; and drying the washed organic-inorganic composite material to prepare an organic-inorganic composite material comprising a coating layer including an anion capable of forming an ionic bond.

In the method, a reactive compound is first added to a porous carbonaceous material to prepare a functionalized porous carbonaceous material comprising a reactive functional group on a surface of the porous carbonaceous material.

The reactive compound may be a lyophilic organic compound including at least one selected from a hydroxyl group (—OH), a carboxyl group (—COOH), and an aldehyde group (—CHO). Examples of the reactive compound may include at least one selected from $CF_3COOH$, $C_2H_5OH$, $CH_3OH$, $CH_3COOH$, and $NH_4OH$, without being limited thereto. Any suitable lyophilic organic compound having a functional group used in the art may be used. By adding the reactive compound, a functionalized porous carbonaceous material having the functional group disposed thereon may be prepared.

The method may further include contacting, e.g. adding, the functionalized porous carbonaceous material with metal oxide particles after preparing the adding a reactive compound. The metal oxide particles may be oxide particles of at least one element selected from magnesium (Mg), aluminum (Al), silicon (Si), phosphorus (P), calcium (Ca), titanium (Ti), vanadium (V), gallium (Ga), germanium (Ge), strontium (Sr), zirconium (Zr), niobium (Nb), molybdenum (Mo), indium (In), tin (Sn), hafnium (Hf), thallium (Ta), and tungsten (W). For example, the metal oxide particles may be particles of at least one element selected from magnesium (Mg), aluminum (Al), silicon (Si), phosphorus (P), calcium (Ca), and titanium (Ti). An amount of the metal oxide particles may be in a range of about 0.1% by weight to about 30% by weight, based on the total weight of the cathode. For example, the amount of the metal oxide particles may be in a range of about 0.1% by weight to about 25% by weight, based on the total weight of the cathode. For example, the amount of the metal oxide particles may be in a range of about 0.1% by weight to about 20% by weight, based on the total weight of the cathode. When the metal oxide having the amount within the ranges described above is added, a passage for oxygen transfer may be easily obtained, thereby improving the oxygen transfer effect.

Then, a positively charged silane-based compound is added to the prepared porous carbonaceous material and the mixture is heat-treated to prepare an organic-inorganic composite material having a coating layer including a silane-based compound chemically bonded to the reactive functional group.

The positively charged silane-based compound may include at least one selected from N-trimethoxysilylpropyl-N,N,N-trimethyl ammonium chloride, N-triethoxysilylpropyl-N,N,N-trimethyl ammonium chloride, and 1-methyl-3-(3-trimethoxysilylpropyl) imidazolium chloride. For example, the positively charged silane-based compound may include N-trimethoxysilylpropyl-N,N,N-trimethyl ammonium chloride or N-triethoxysilylpropyl-N,N,N-trimethyl ammonium chloride.

The preparing of the organic-inorganic composite material comprising the coating layer including the silane-based compound chemically bonded to the reactive functional group may be performed while heat-treating the mixture at a temperature of 40° C. or greater. For example, the preparing of the organic-inorganic composite material having the coating layer including the silane-based compound chemically bonded to the reactive functional group may be performing while heat-treating the mixture at a temperature of about 40° C. to about 80° C., about 45° C. to about 75° C., or about 50° C. to about 70° C., for about 1 to about 10 hours, for about 2 to about 9 hours, or for about 3 to about 8 hours. The preparing of the organic-inorganic composite material having the coating layer including the silane-based compound chemically bonded to the reactive functional group may be performed in a sealed space such as a plastic pouch bag. When the preparing of the organic-inorganic composite material having the coating layer is performed in an open space, the coating layer may not be uniformly formed due to volatilization of the solvent.

Next, the prepared organic-inorganic composite material having the coating layer is washed with a salt and dried to prepare an organic-inorganic composite material comprising a coating layer including the anion capable of forming an ionic bond.

The anion capable of forming an ionic bond may include at least one selected from $PF_6^-$, $BF_4^-$, $SbF_6^-$, $AsF_6^-$, $(SO_2C_2F_5)_2N^-$, $(CF_3SO_2)_2N^-$, $C_4F_9SO_3^-$, $ClO_4^-$, $AlO_2^-$, $AlCl_4^-$, $(C_xF_{2x+1}SO_2)(C_yF_{2y+1}SO_2)N^-$ wherein x and y are natural numbers, $F^-$, $Br^-$, $Cl^-$, $I^-$, and $(C_2O_4)_2B^-$. The anion capable of forming an ionic bond may be anion-exchanged with an anion of the positively charged silane-based compound, thereby forming a stable coating layer.

The method may further include preparing a cathode slurry by mixing the prepared organic-inorganic composite material with a gel electrolyte and preparing a cathode complexed with the gel electrolyte by coating the cathode slurry on a solid electrolyte membrane. The cathode slurry may be coated by using any suitable coating method used in the art, such as bar coating or doctor blading.

In the cathode slurry, a weight ratio of the organic-inorganic composite material to the gel electrolyte may be in a range of about 1:2 to about 1:8. For example, the weight ratio of the organic-inorganic composite material to the gel electrolyte may be in a range of about 1:2 to about 1:6. For example, the weight ratio of the organic-inorganic composite material to the gel electrolyte may be in a range of about 1:2 to about 1:4. When the cathode is prepared using the cathode slurry having the mixing ratio within the ranges described above, a lithium air battery including the cathode may have excellent ion conductivity and high discharge capacity due to reduced interface resistance.

Hereinafter, an embodiment is described in further detail with reference to the following examples. These examples shall not limit the purpose and scope of the disclosed embodiments.

EXAMPLES

Preparation of an Organic-Inorganic Composite Material

Example 1

50 grams (g) of $CF_3COOH$ was added to 1.0 g of carbon black powder (Printex®, Evonik Carbon Black Co. Ltd.), and the mixture was stirred at 60° C. for 3 hours. The mixture was filtered, washed with 100 mL of ethanol, and dried at 60° C. for 12 hours. 100 g of 35% $NH_4OH$ was added to the dried mixture and the resultant was stirred at 60° C. overnight. The resultant mixture was further filtered, washed with 100 mL of ethanol, and dried at 60° C. for 12 hours to obtain carbon powder having a hydroxyl group (—OH) on the surface thereof. The obtained carbon powder was stored in a dry room.

4.2 g of N-trimethoxysilylpropyl-N,N,N-trimethyl ammonium chloride was added to 1.0 g of the carbon powder having a hydroxyl group (—OH) on the surface. The mixture was added to a plastic pouch bag, mixed for 15 minutes, and initially impregnated. The mixture was aged at 60° C. for 24 hours to form a coating layer including N-trimethoxysilylpropyl-N,N,N-trimethyl ammonium chloride on the carbon powder via an ether bond formed by a reaction between the hydroxyl group (—OH) of the surface of the carbon powder and N-trimethoxysilylpropyl-N,N,N-trimethyl ammonium chloride.

The carbon powder having the coating layer on the surface was washed five times with a 5% lithium bis(fluoromethane sulfonyl)imide (LiTFSI) solution in which LiTFSI was dissolved in methanol. Then, the carbon powder having the coating layer was further washed five times with the 5% LiTFSI solution in which LiTFSI was dissolved in methanol by a centrifugal force. The washed resultant was dried in a vacuum at 60° C. for 2 hours to perform anion-exchange between the chloride anion of the coating layer and the bis(fluoromethane sulfonyl)imide (TFSI) anion. Thus, an organic-inorganic composite material powder having a coating layer including a positively charged N-trimethoxysilylpropyl-N,N,N-trimethyl ammonium group and a TFSI anion was prepared. The prepared organic-inorganic composite material powder was stored in a dry room.

An amount of the coating layer measured by thermogravimetric analysis (TGA) was 1.1% by weight, based on the total weight of the organic-inorganic composite material.

Example 2

50 g of $CF_3COOH$ was added to 1.0 g of carbon black powder (Printex®, Evonik Carbon Black Co. Ltd.), and the mixture was stirred at 60° C. for 3 hours. The mixture was filtered, washed with 100 mL of ethanol, and dried at 60° C. for 12 hours. 100 g of 35% NH₄OH was added to the dried mixture and the resultant was stirred at 60° C. overnight. The resultant mixture was further filtered, washed with 100 mL of ethanol, and dried at 60° C. for 12 hours to obtain carbon powder having a hydroxyl group (—OH) on the surface thereof. The obtained carbon powder was stored in a dry room.

0.04 g of $SiO_2$ powder (having an average particle diameter of 10 nm) was added to 0.36 g of the carbon powder having a hydroxyl group (—OH) on the surface. The mixture was added to a plastic pouch bag and mixed for 15 minutes. Then, 4.2 g of N-trimethoxysilylpropyl-N,N,N-trimethyl ammonium chloride was added thereto. The resultant was added to a plastic pouch bag, mixed for 15 minutes, and initially impregnated. The mixture was aged at 60° C. for 24 hours to form a coating layer including N-trimethoxysilylpropyl-N,N,N-trimethyl ammonium chloride on the carbon powder via an ether bond formed by a reaction between the hydroxyl group (—OH) of the surface of the carbon powder and N-trimethoxysilylpropyl-N,N,N-trimethyl ammonium chloride.

The carbon powder having the coating layer on the surface was washed five times with a 5% LiTFSI solution in which LiTFSI was dissolved in methanol. Then, the carbon powder having the coating layer was further washed five times with the 5% LiTFSI solution in which LiTFSI was dissolved in methanol by using a centrifugal force. The washed resultant was dried in a vacuum at 60° C. for 2 hours to perform anion-exchange between the chloride anion of the coating layer and the bis(fluoromethane sulfonyl)imide (TFSI) anion. Thus, an organic-inorganic composite material powder having a coating layer including a positively charged N-trimethoxysilylpropyl-N,N,N-trimethyl ammonium group and a TFSI anion was prepared. The prepared organic-inorganic composite material powder was stored in a dry room.

An amount of the coating layer measured by TGA was 4.1% by weight based on the total weight of the organic-inorganic composite material.

Example 3

50 g of $CF_3COOH$ was added to 1.0 g of carbon black powder (Printex®, Evonik Carbon Black Co. Ltd.), and the mixture was stirred at 60° C. for 3 hours. The mixture was filtered, washed with 100 mL of ethanol, and dried at 60° C. for 12 hours. 100 g of 35% NH₄OH was added to the dried mixture and the resultant was stirred at 60° C. overnight. The resultant mixture was further filtered, washed with 100 mL of ethanol, and dried at 60° C. for 12 hours to obtain carbon powder having a hydroxyl group (—OH) on the surface thereof. The obtained carbon powder was stored in a dry room.

0.19 g of $SiO_2$ powder (having an average particle diameter of 10 nm) was added to 0.75 g of the carbon powder having a hydroxyl group (—OH) on the surface. The mixture was added to a plastic pouch bag and mixed for 15 minutes. Then, 4.2 g of N-trimethoxysilylpropyl-N,N,N-trimethyl ammonium chloride was added thereto. The resultant was added to a plastic pouch bag, mixed for 15 minutes, and initially impregnated. The mixture was aged at 60° C. for 24 hours to form a coating layer including N-trimethoxysilylpropyl-N,N,N-trimethyl ammonium chloride on the carbon powder via an ether bond formed by a reaction between the hydroxyl group (—OH) of the surface of the carbon powder and N-trimethoxysilylpropyl-N,N,N-trimethyl ammonium chloride.

The carbon powder having the coating layer was washed five times with a 5% LiTFSI solution in which LiTFSI was dissolved in methanol. Then, the carbon powder having the coating layer on the surface was further washed five times with the 5% LiTFSI solution in which LiTFSI was dissolved in methanol by using a centrifugal force. The washed resultant was dried in a vacuum at 60° C. for 2 hours to perform anion-exchange between the chloride anion of the coating layer and the TFSI anion. Thus, an organic-inorganic composite material powder having a coating layer including a positively charged N-trimethoxysilylpropyl-N,N,N-trimethyl ammonium group and a TFSI anion was prepared. The prepared organic-inorganic composite material powder was stored in a dry room.

An amount of the coating layer measured by TGA was 4.98% by weight based on the total weight of the organic-inorganic composite material.

Comparative Example 1

Carbon Black Powder (Printex®, Evonik Carbon Black Co. Ltd.) was Used.]

Manufacture of a Cathode

Example 4

93% by weight of poly(ethylene glycol) dimethyl ether (PEGDME, ≥99% HPLC grade, number average molecular weight (Mn)=500 Da, Sigma Aldrich) and 7% by weight of $SiO_2$ (having an average particle diameter of 10 nm) were added to a 1 M lithium bis(fluoromethane sulfonyl)imide (LiTFSI) solution in which LiTFSI was dissolved in propylene carbonate to prepare a gel electrolyte.

The organic-inorganic composite material powder prepared according to Example 1 was mixed with the prepared gel electrolyte at a weight ratio of 1:3 to prepare a cathode slurry. The cathode slurry was coated on a solid electrolyte membrane of $Li_2O$—$Al_2O_3$—$TiO_2$—$P_2O_5$ (LATP) (having a thickness of 250 μm, OHARA), dried at 25° C. for 24 hours, and heat-treated in a vacuum at 120° C. for 2 hours to prepare a cathode complexed with a gel electrolyte. The prepared cathode had a weight of 2 mg/cm².

Example 5

A cathode complexed with a gel electrolyte was prepared in the same manner as in Example 4, except that a cathode slurry was prepared by mixing the organic-inorganic composite material powder prepared according to Example 2 and the prepared gel electrolyte at a weight ratio of 1:3 instead of preparing the cathode slurry by mixing the organic-inorganic composite material powder prepared according to Example 1 and the prepared gel electrolyte at a weight ratio of 1:3.

Example 6

A cathode complexed with a gel electrolyte was prepared in the same manner as in Example 4, except that a cathode slurry was prepared by mixing the organic-inorganic composite material powder prepared according to Example 3 and the prepared gel electrolyte at a weight ratio of 1:3 instead of preparing the cathode slurry by mixing the organic-inorganic composite material powder prepared according to Example 1 and the prepared gel electrolyte at a weight ratio of 1:3.

Example 7

A cathode complexed with a gel electrolyte was prepared in the same manner as in Example 4, except that a cathode slurry was prepared by mixing the organic-inorganic composite material powder prepared according to Example 1 and the prepared gel electrolyte at a weight ratio of 1:4 instead of preparing the cathode slurry by mixing the organic-inorganic composite material powder prepared according to Example 1 and the prepared gel electrolyte at a weight ratio of 1:3.

Example 8

A cathode complexed with a gel electrolyte was prepared in the same manner as in Example 4, except that a cathode slurry was prepared by mixing the organic-inorganic composite material powder prepared according to Example 2 and the prepared gel electrolyte at a weight ratio of 1:4 instead of preparing the cathode slurry by mixing the organic-inorganic composite material powder prepared according to Example 1 and the prepared gel electrolyte at a weight ratio of 1:3.

Example 9

A cathode complexed with a gel electrolyte was prepared in the same manner as in Example 4, except that a cathode slurry was prepared by mixing the organic-inorganic composite material powder prepared according to Example 3 and the prepared gel electrolyte at a weight ratio of 1:4 instead of preparing the cathode slurry by mixing the organic-inorganic composite material powder prepared according to Example 1 and the prepared gel electrolyte at a weight ratio of 1:3.

Comparative Example 2

A cathode complexed with a gel electrolyte was prepared in the same manner as in Example 4, except that a cathode slurry was prepared by mixing the organic-inorganic composite material powder prepared according to Comparative Example 1 and the prepared gel electrolyte at a weight ratio of 1:3 instead of preparing the cathode slurry by mixing the organic-inorganic composite material powder prepared according to Example 1 and the prepared gel electrolyte at a weight ratio of 1:3.

Comparative Example 3

A cathode complexed with a gel electrolyte was prepared in the same manner as in Example 4, except that a cathode slurry was prepared by mixing the organic-inorganic composite material powder prepared according to Comparative Example 1 and the prepared gel electrolyte at a weight ratio of 1:4 instead of preparing the cathode slurry by mixing the organic-inorganic composite material powder prepared according to Example 1 and the prepared gel electrolyte at a weight ratio of 1:3.

Manufacture of a Lithium Air Battery

Example 10

A copper foil was fixed on a Teflon case, a lithium metal thin film, as an anode, having a diameter of 16 mm was mounted thereon, and a polymer electrolyte membrane was disposed on the anode.

Here, the polymer electrolyte membrane was prepared by mixing 2.07 g of polyethylene oxide (PEO, a weight average molecular weight of about 600,000, Aldrich) and 0.75 g of lithium bis(trifluoromethanesulfonyl)imide (LiTFSI) in an acetonitrile solvent, and removing the acetonitrile solvent by gradually drying the acetonitrile solvent.

The cathode complexed with the gel electrolyte prepared according to Example 4 was laminated on the polymer electrolyte membrane. A GDL graphite sheet (SGL-35DA, Carbon Japan, Ltd.) having a thickness of 350 µm as a gas diffusion layer and a stainless steel wire (SUS) mesh having a diameter of 15 mm as a current collector were sequentially laminated on the cathode to manufacture a lithium air battery.

In other words, the lithium air battery was manufactured in the order of copper foil-lithium metal thin film anode-polymer electrolyte membrane-cathode complexed with the gel electrolyte prepared according to Example 4-gas diffusion layer-SUS mesh.

Lastly, the Teflon case was covered and pressed with a pressing member to fix the lithium air battery. An exemplary structure of the lithium air battery is illustrated in FIG. 2.

Examples 11 to 15

Lithium air batteries were manufactured in the same manner as in Example 10, except that the cathodes complexed with the gel electrolyte prepared according to Examples 5 to 9 were used instead of the cathode complexed with the gel electrolyte prepared according to Example 4.

Comparative Examples 4 and 5

Lithium air batteries were manufactured in the same manner as in Example 10, except that the cathodes prepared according to Comparative Examples 2 and 3 were used instead of the cathode complexed with the gel electrolyte prepared according to Example 4.

Analysis of Coating Layer of Organic-Inorganic Composite Material

Analysis Example 1

High Resolution Transmission Electron Microscopy (HR-TEM) and Energy-Dispersive X-Ray Spectroscopy (EDX) Analysis The organic-inorganic composite material prepared according to Example 2 was observed by high resolution transmission electron microscopy (HR-TEM). The results are shown in FIGS. 3A to 3D. TITAN-80-300 (FEI) was used in the HR-TEM.

Figure 3A:
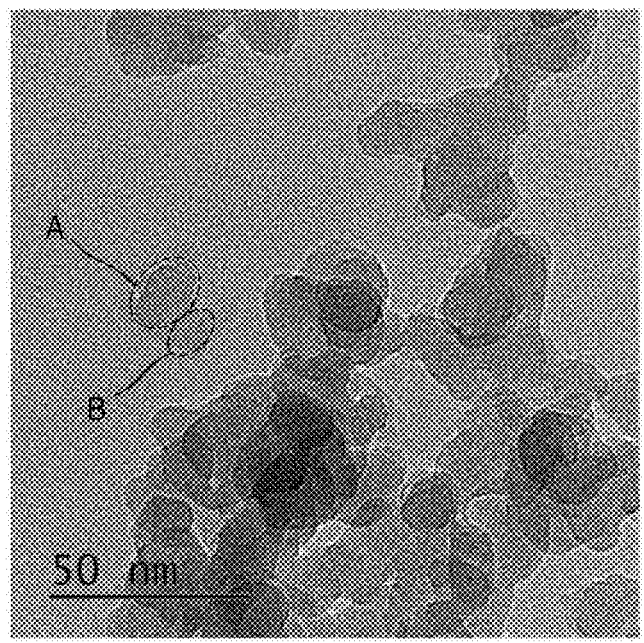
FIGS. 3A to 3D are high resolution transmission electron microscopy (HR-TEM) images of an organic-inorganic composite material prepared according to Example 2.
Figure 3B:
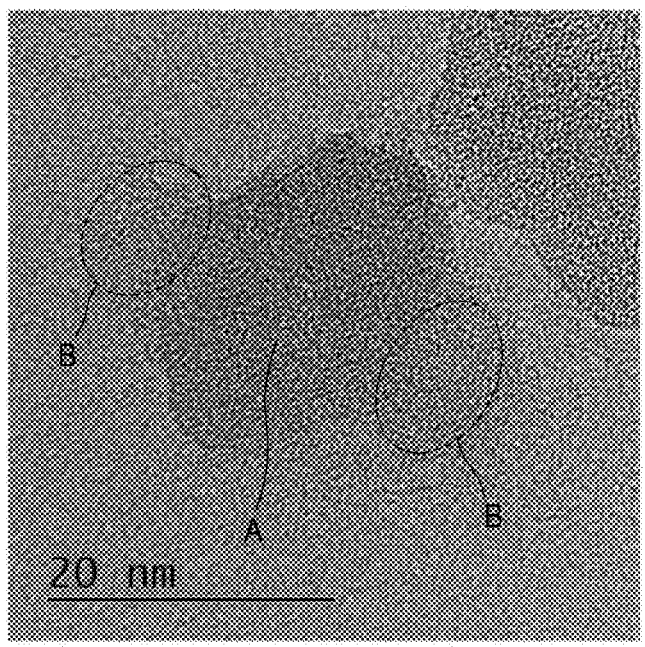

Referring to FIGS. 3A and 3B, it may be confirmed that an $SiO_2$ particle (marked as "A") exists on the surface of a carbon black particle of the organic-inorganic composite material prepared according to Example 2, and the surface of the $SiO_2$ particle is functionalized with reactive functional groups (marked as "B").

Figure 3C:
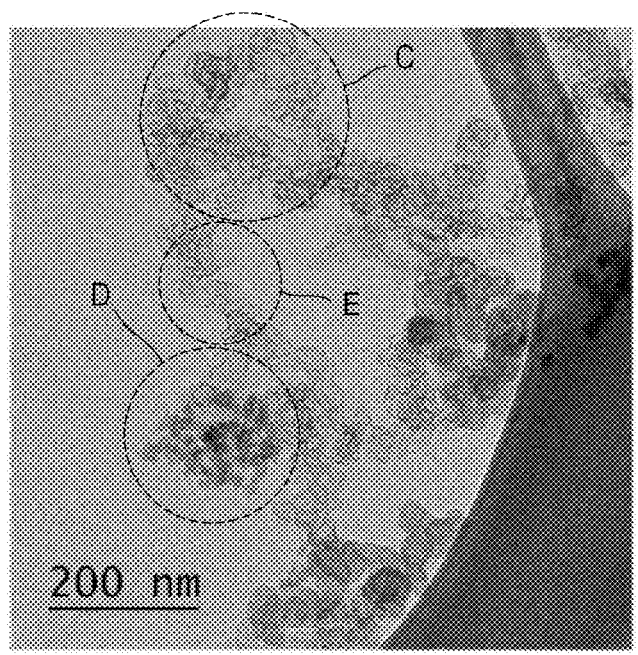
Figure 3D:
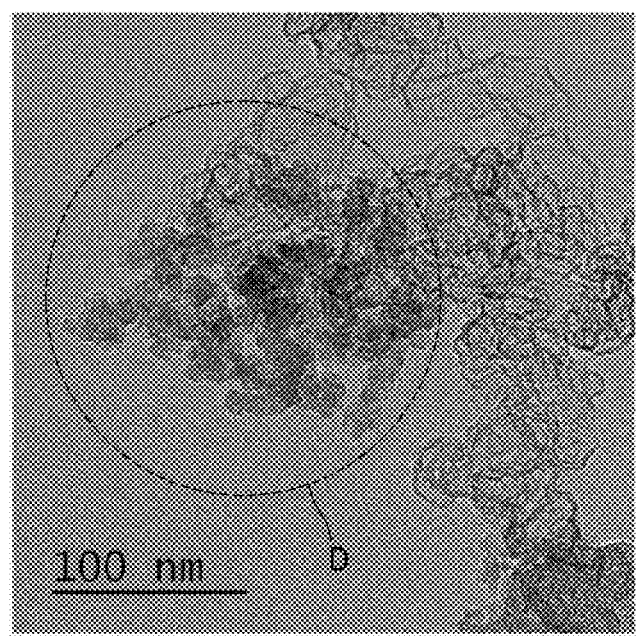

Referring to FIGS. 3C and 3D, it may be confirmed that a positively charged silane-based compound and an anion capable of forming an ionic bond are chemically bonded to the surface of a carbon black particle (marked as "C") of the organic-inorganic composite material prepared according to Example 2 in a linker-like form (marked as "E"), and a reactive functional group of an $SiO_2$ particle (marked as "D") is chemically bonded to the positively charged silane-based compound and the anion capable of forming an ionic bond connected in a grafted form from the surface of the carbon black particle.

In addition, the organic-inorganic composite material prepared according to Example 2 was tested by scanning transmission electron microscopy with energy-dispersive X-ray spectrometry (STEM-EDX). The results are shown in FIGS. 4A to 4E. Titan Cubed G2 60-300 (FEI) was used in the STEM-EDX.

Figure 4A:
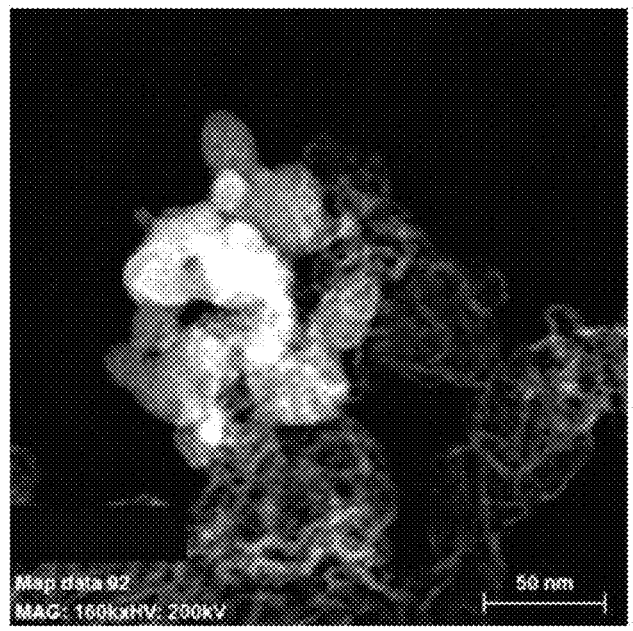
FIGS. 4A to 4F are scanning transmission electron microscopy with energy-dispersive X-ray spectrometry (STEM-EDX) images of the organic-inorganic composite material prepared according to Example 2.
Figure 4B:
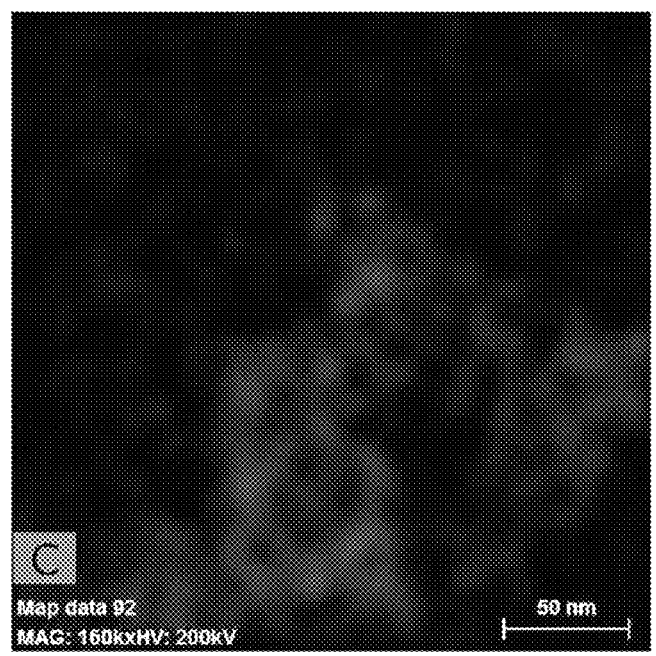
Figure 4C:
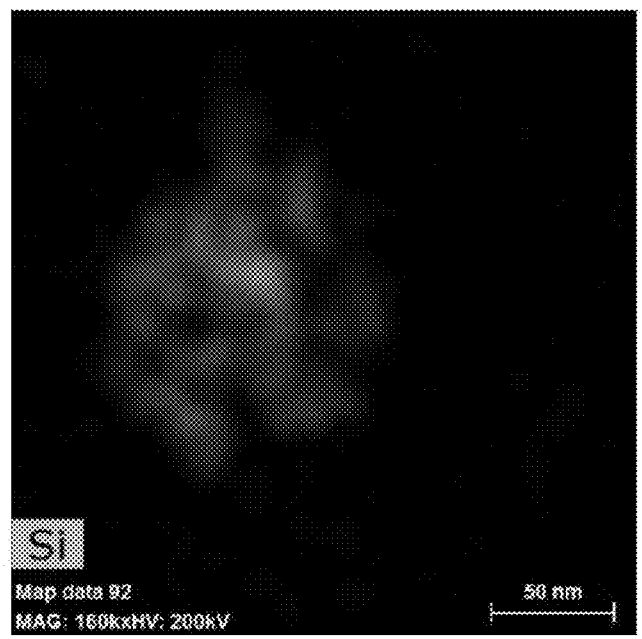
Figure 4D:
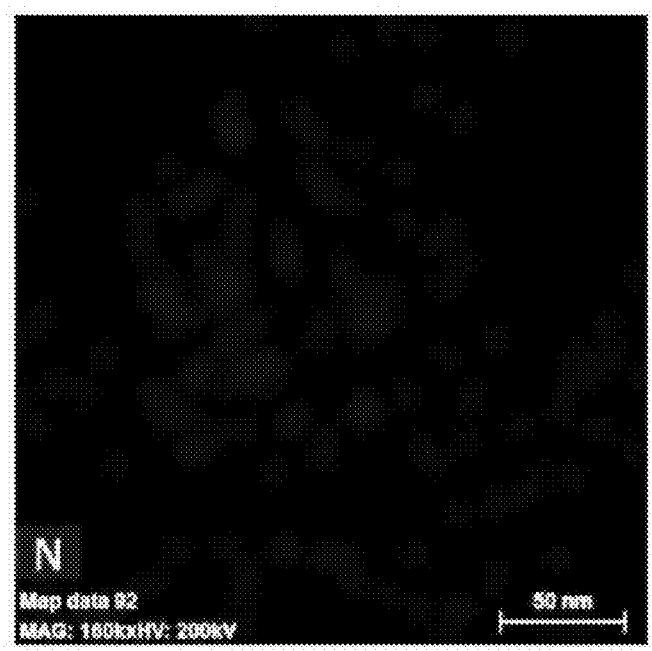
Figure 4E:
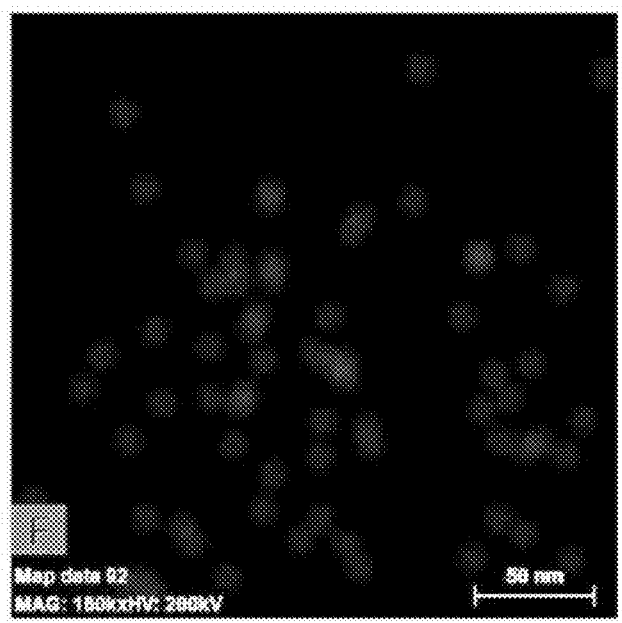
Figure 4F:
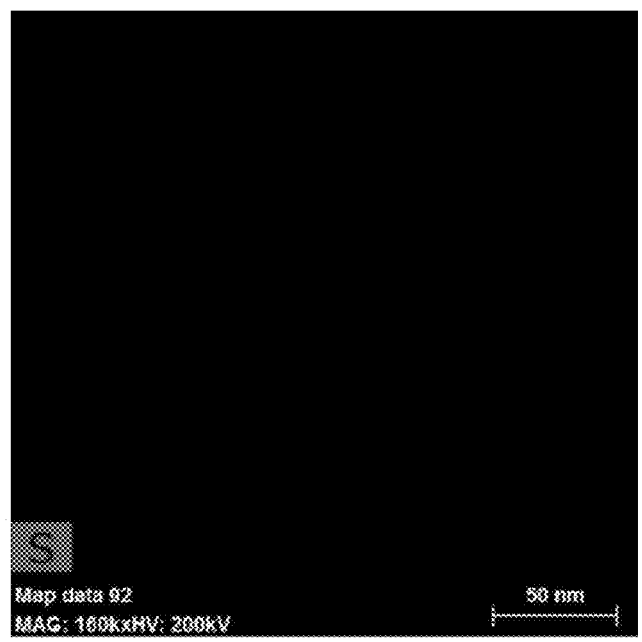

FIG. 4A is an STEM-EDX image of the entire organic-inorganic composite material prepared according to Example 2. FIGS. 4B to 4E are STEM-EDX images of elements C, Si, N, and F contained in the organic-inorganic composite material, respectively. Referring to FIGS. 4B to 4E, it may be confirmed that all of the elements C, Si, N, and F exist in the organic-inorganic composite material. Accordingly, it may be confirmed that a composition including these elements is contained in the organic-inorganic composite material according to Example 2.

Evaluation of Battery Performance

Evaluation Example 1

Evaluation of Impedance

A shielding electrode was prepared by depositing platinum (Pt) on both surfaces of each of the cathodes prepared according to Examples 4 to 6 and Comparative Example 2 by sputtering. Impedance of each sample on which the electrode is formed was measured using an impedance analyzer (Solatron SI1260 impedance/gain-phase analyzer) by a 2-probe method. A frequency range was about 0.1 Hz to about 1 MHz, and an amplitude voltage was 20 mV. The impedance was measured under atmospheric conditions at 25° C. Area specific resistance was calculated from an arc of a Nyquist plot with respect to measurements of impedance. The results are shown in Table 1 below and FIG. 5.

Here, a first x-intercept of a semicircle axis (i.e., intercept of the horizontal axis) indicates an area specific resistance of the electrode, and a difference between the first and second x-intercepts indicates an interface area specific resistance between the electrolyte and the cathode. A transmission-line matrix (TLM) model through equivalent circuit fitting was applied thereto.

TABLE 1

| Example | Area specific resistance of electrolyte (ohm · cm$^2$) | Interface area specific resistance between electrolyte and cathode (ohm · cm$^2$) |
| --- | --- | --- |
| Example 4 | 89.80 | 122.5 |
| Example 5 | 72.04 | 115.8 |
| Example 6 | 66.51 | 106.8 |
| Comparative Example 2 | 163.4 | 123.8 |

Figure 5:
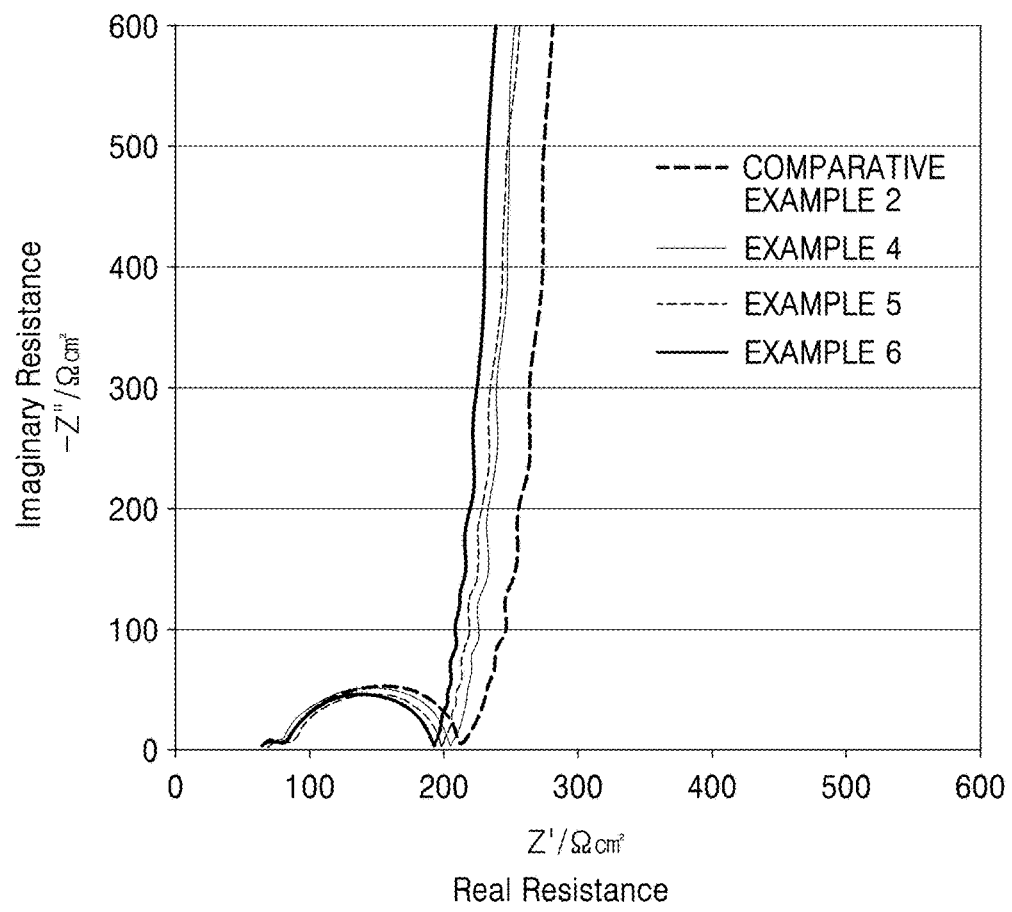
FIG. 5 is a graph of imaginary resistance ($Z''$, ohms·cm$^2$) versus real resistance ($Z'$, ohms·cm$^2$) showing the results of impedance evaluation performed on cathodes prepared according to Examples 4 to 6 and Comparative Example 2.

Referring to Table 1 and FIG. 5, the cathodes prepared according to Examples 4 to 6 had lower area specific resistances of the electrolytes and lower interface area specific resistance between the electrolyte and the cathode compared with the cathode prepared according to Comparative Example 2. Particularly, the area specific resistances of the electrolytes contained in the cathodes according to Examples 4 to 6 were reduced by 45%, 56%, and 59%, respectively, compared with that of the electrolyte according to Comparative Example 2. The interface area specific resistances between the electrolytes contained in the cathodes according to Examples 4 to 6 and the cathodes were reduced by 1.0%, 6.5%, and 7.8%, respectively, compared with the interface area specific resistance between the electrolyte contained in the cathode according to Comparative Example 2 and the cathode.

Thus, it may be confirmed that the cathodes prepared according to Examples 4 to 6 had lower resistance to lithium ion transfer between the cathode and the electrolyte compared to the cathode prepared according to Comparative Example 2.

Evaluation Example 2

Evaluation of Charge and Discharge Characteristics

At 60° C., at 1 atm, in an oxygen atmosphere, a charge and discharge cycle was performed in such a way that the lithium air batteries manufactured in Examples 10 to 12 and Comparative Example 4 were discharged to 1.8 V (vs. Li) with a constant current of 2.0 mA/cm$^2$, and then charged again to 4.2 V with the same current. At the same temperature and pressure and in an oxygen atmosphere, a charge and discharge cycle was performed in such a way that the lithium air batteries manufactured in Examples 13 to 15 and Comparative Example 5 were discharged to 1.8 V (vs. Li) with a constant current of 0.24 mA/cm$^2$, and then charged again to 4.2 V with the same current.

Some results of a first cycle of a charge and discharge test are shown in Tables 2 and 3 below and FIG. 6.

The unit weight at the discharge capacity is the total weight of the cathode.

TABLE 2

| Example | Discharge capacity [mAh/g] |
| --- | --- |
| Example 10 | 814 |
| Example 11 | 848 |
| Example 12 | 767 |
| Comparative Example 4 | 805 |

TABLE 3

| Example | Discharge capacity [mAh/g] |
| --- | --- |
| Example 13 | 732 |
| Example 14 | 761 |
| Example 15 | 772 |
| Comparative Example 5 | 721 |

Figure 6:
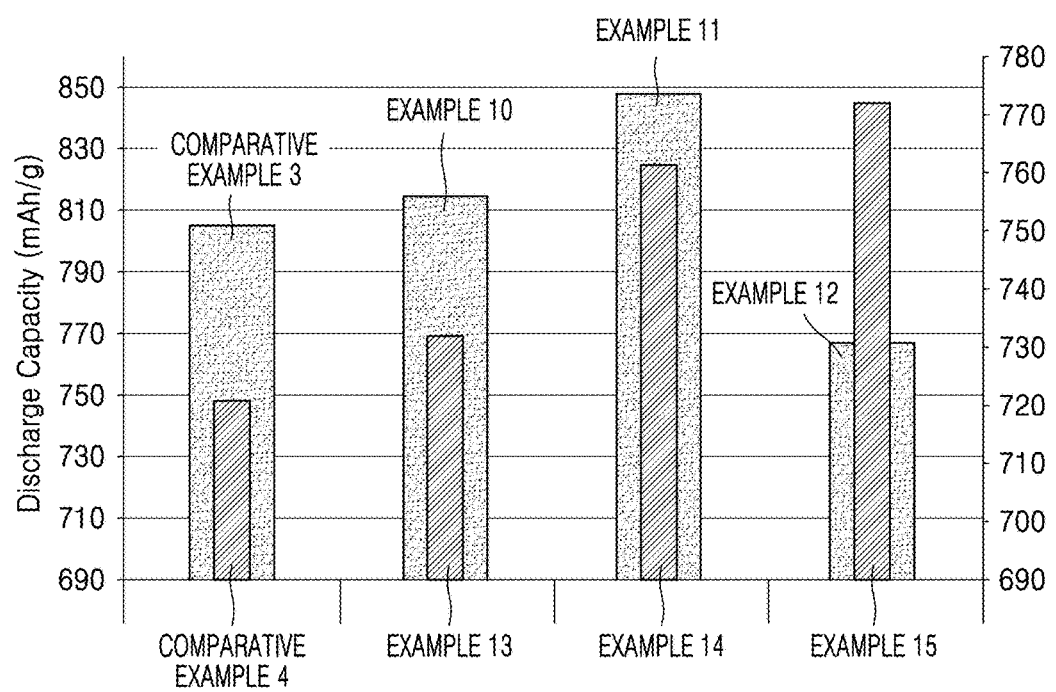
FIG. 6 is a graph of first discharge capacity (milliampere-hours per gram, mAh/g) of lithium air batteries manufactured according to Examples 10 to 15 and Comparative Examples 4 and 5.

Referring to Tables 2 and 3 and FIG. 6, the discharge capacities of the lithium air batteries manufactured according to Examples 10 and 11 were improved compared with the discharge capacity of the lithium air battery manufactured according to Comparative Example 4. In addition, the discharge capacities of the lithium air batteries manufactured according to Examples 13 to 15 were improved compared with the discharge capacity of the lithium air battery manufactured according to Comparative Example 5.

The discharge capacity may be increased due to an increase in oxygen concentration inside the cathode as a result of increase in oxygen transfer to the inside of the cathode.

As described above, according to the one or more of the above exemplary embodiments, the lithium air battery including the organic-inorganic composite material may have improved discharge capacity by reducing the interface resistance thereof.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A cathode for a lithium air battery, the cathode comprising:
   an organic-inorganic composite material comprising a coating layer on at least a portion of a surface of a core,
   wherein the core comprises a porous carbonaceous material, and
   wherein the coating layer comprises a positively charged silane compound and an anion capable of forming an ionic bond.

2. The cathode of claim 1, wherein the positively charged silane compound is chemically bonded to the surface of the core.

3. The cathode of claim 1, wherein the positively charged silane compound is chemically bonded to a reactive functional group disposed on the surface of the core.

4. The cathode of claim 3, wherein the reactive functional group is a lyophilic functional group comprising at least one functional group selected from a hydroxyl group, a carboxyl group, and an aldehyde group.

5. The cathode of claim 1, wherein the positively charged silane compound comprises at least one positively charged organofunctional group selected from a quaternary ammonium group, an imidazolium group, a pyridinium group, a pyrrolidinium group, a piperidinium group, and a morpholinium group.

6. The cathode of claim 1, wherein the silane compound comprises at least one selected from N-trimethoxysilylpropyl-N,N,N-trimethyl ammonium chloride, N-triethoxysilylpropyl-N,N,N-trimethyl ammonium chloride, and 1-methyl-3-(3-trimethoxysilylpropyl) imidazolium chloride.

7. The cathode of claim 1, wherein the ionic bond forming anion comprises at least one selected from $PF_6^-$, $BF_4^-$, $SbF_6^-$, $AsF_6^-$, $(SO_2C_2F_5)_2N^-$, $(CF_3SO_2)_2N^-$, $C_4F_9SO_3^-$, $ClO_4^-$, $AlO_2^-$, $AlCl_4^-$, $(C_xF_{2x+1}SO_2)(C_yF_{2y+1}SO_2)N^-$ wherein x and y are natural numbers, $F^-$, $Br^-$, $Cl^-$, $I^-$, and $(C_2O_4)_2B^-$.

8. The cathode of claim 1, wherein an amount of the coating layer is in a range of about 0.1% by weight to about 20% by weight, based on a total weight of the organic-inorganic composite material.

9. The cathode of claim 1, wherein the coating layer further comprises metal oxide particles.

10. The cathode of claim 9, wherein a reactive functional group is disposed on a surface of the metal oxide particles.

11. The cathode of claim 10, wherein the coating layer is connected to a surface of a porous carbonaceous material by a chemical bond between the reactive functional group of the surface of a metal oxide particle and the positively charged silane compound.

12. The cathode of claim 10, wherein the reactive functional group comprises at least one lyophilic functional group selected from a hydroxyl group, a carboxyl group, and an aldehyde group.

13. The cathode of claim 9, wherein an amount of the metal oxide particles is in a range of about 0.1% by weight to about 30% by weight, based on a total weight of the cathode.

14. A lithium air battery comprising:
   an anode capable of intercalating and deintercalating lithium ions;
   the cathode according to claim 1; and
   an electrolyte interposed between the anode and the cathode.

15. The lithium air battery of claim 14, wherein the electrolyte is selected from a liquid electrolyte, a gel electrolyte, and a solid electrolyte.

16. The lithium air battery of claim 15, wherein the electrolyte is a gel electrolyte, and wherein the gel electrolyte further comprises a metal oxide.

17. A method of manufacturing a cathode, the method comprising:
   adding a reactive compound to a porous carbonaceous material core to bond a reactive functional group to a surface of the porous carbonaceous material core to provide a functionalized porous carbonaceous material;
   adding a positively charged silane compound to the functionalized porous carbonaceous material core to form a mixture;
   heat-treating the mixture to prepare an organic-inorganic composite material comprising a coating layer comprising a silane compound chemically bonded to the reactive functional group;
   washing the organic-inorganic composite material comprising the coating layer with a salt; and
   drying the washed organic-inorganic composite material to prepare an organic-inorganic composite material comprising a coating layer comprising an anion capable of forming an ionic bond.

18. The method of claim 17, further comprising contacting the functionalized porous carbonaceous material with metal oxide particles after the adding a reactive compound.

19. The method of claim 17, further comprising mixing the dried organic-inorganic composite material with a gel electrolyte to prepare a cathode slurry; and
   coating the cathode slurry on a solid electrolyte membrane to prepare a cathode complexed with the gel electrolyte.

20. The method of claim 19, wherein a weight ratio of the organic-inorganic composite material to the gel electrolyte in the cathode slurry is in a range of about 1:2 to about 1:8.

* * * * *